United States Patent [19]

Childs

[11] Patent Number: 5,727,484
[45] Date of Patent: Mar. 17, 1998

[54] SOIL PENETRATING APPLICATOR AND METHOD

[76] Inventor: Robert C. Childs, P.O. Box 9, Marietta, S.C. 29661

[21] Appl. No.: 645,112

[22] Filed: May 13, 1996

[51] Int. Cl.$^6$ ................................................ A01C 23/02
[52] U.S. Cl. ..................... 111/7.4; 111/7.1; 239/271; 47/48.5
[58] Field of Search .................... 111/7.1, 7.2, 7.3, 111/7.4; 47/48.5, 48.5 G, 48.5 R; 237/271

[56] References Cited

U.S. PATENT DOCUMENTS

| | | | |
|---|---|---|---|
| 1,135,346 | 4/1915 | Barnhart | 111/7.3 |
| 1,624,033 | 4/1927 | Barnard | 111/7.2 |
| 1,668,156 | 5/1928 | Kitterman | 111/7.2 |
| 1,747,494 | 2/1930 | Sullivan | 111/7.2 |
| 1,937,172 | 11/1933 | Starner et al. | 111/7.1 |
| 1,964,064 | 6/1934 | Karshner | 111/7.1 |
| 1,991,930 | 2/1935 | Hope | 111/7.1 |
| 1,997,097 | 4/1935 | Bartlett | 111/7.1 |
| 2,296,500 | 9/1942 | Cain | 111/7.2 |
| 2,803,924 | 8/1957 | Little | 111/7.2 |
| 2,867,943 | 1/1959 | Whitesell | 111/7.2 |
| 2,885,121 | 5/1959 | Littleton | 111/7.3 |
| 2,893,334 | 7/1959 | Snyder | 111/7.1 |
| 3,026,827 | 3/1962 | Cunningham | 111/7.1 |
| 4,168,749 | 9/1979 | Adams | 111/7.4 X |
| 4,705,218 | 11/1987 | Daniels | 111/7.1 X |
| 4,807,545 | 2/1989 | Joy | 111/7.1 |
| 4,872,411 | 10/1989 | Nagy | 111/7.1 |

*Primary Examiner*—Terry Lee Melius
*Assistant Examiner*—Victor Batson
*Attorney, Agent, or Firm*—Ralph Bailey

[57] ABSTRACT

An applicator is illustrated for introducing a flow of chemical adjacent the roots of a plant without supplying chemical to adjacent plant material utilizing a tubular guide (A) which acts as a cover for a needle (D) which is carried by an inner tubular support (B) which carries a dispensing tube for connection to a source of pressurized chemical (F). The dispensing tube is connected through the handle (E) and a compression spring (G) is provided to urge the tubular guide (A) downwardly for acting as a guard for the needle.

8 Claims, 3 Drawing Sheets

SOIL PENETRATING APPLICATOR AND METHOD

BACKGROUND OF THE INVENTION

This invention relates to an apparatus and method for introducing a flow of a liquid chemical composition such as a herbicide or fertilizer adjacent the roots of a plant so as to concentrate the application of the chemical adjacent the roots while avoiding application to other adjacent plant material.

A pneumatic chemical applicator is illustrated in U.S. Pat. No. 5,050,340 wherein different chemicals from several sources may be mixed through the application of air and liquid through suitable valves in an elongated discharge assembly carrying a sharpened point for penetrating the earth. This device is complicated due to the multiplicity of the valves and the difficulty of injecting the discharge assembly into the soil surrounding a plant as, for example, around a tree. The patented apparatus contemplates the use of a special attachment adjacent the sharpened point acting as an air shield while another attachment may serve to broadcast a chemical as an alternative to injection of the chemical into the earth.

The prior art is further exemplified by the following U.S. Pat. Nos. 2,242,789, 2,302,799, 2,505,174, 2,713,834, 3,405,669, 3,903,815, 4,170,948, and 4,247,046.

In the case of liquid herbicides it is common practice to utilize a pressurized spray container and in doing so apply the herbicide not only when needed but also to the surrounding lawn or other adjacent plant material. This practice results in the creation of unsightly areas of dead plant life requiring further attention in order to restore the area to proper growing conditions.

It is also important that fertilizer is applied where needed or loss may result from its being washed away by the rain. For example, fertilizer is preferably applied around a tree at spaced locations where it is received and covered with soil.

SUMMARY OF THE INVENTION

Accordingly, it is an important object of this invention to provide a soil penetrating applicator and method wherein a needle-like member may be guided into the soil adjacent the roots of a plant for concentrating the application of the chemical composition there while avoiding undesired application of the chemical to other plant material such as surrounding grass or shrubbery.

Another important object of the invention is the provision of a chemical applicator having an elongated needle for penetrating the earth which is provided with a resiliently biased guard for automatically covering the needle to avoid injury to users or to the needle itself except when the needle is penetrating the earth.

Another important object of the invention is the provision of an elongated guide member for slidable carrying an inner tubular support having a handle and a connection for attaching a source of chemicals under pressure.

An especially important object of the invention is the provision of means for applying a chemical such as a herbicide directly to the roots of a weed so as to increase its concentration in an area where it will best accomplish its purpose while avoiding contamination of a lawn which would result in damage to the adjacent plant material.

Another object of the invention is the provision of a versatile applicator capable of distributing either a fertilizer or a herbicide in a specific area for concentrating the effects of the chemical avoiding broadcasting the chemical into areas where application is not wanted.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an applicator for introducing a flow of chemical adjacent the roots of a plant including an elongated exterior tubular guide A for engaging the ground on one end. An elongated, inner tubular support B is carried within the exterior guide. A dispensing tube C is carried within the inner tubular support. An elongated needle penetrating member D is carried on the dispensing tube having an orifice therein to facilitate the flow of chemical to the roots of the plant. A handle E is carried by a free end of the inner support. Thus, application of a chemical may be concentrated in the root area of a plant while avoiding application to other adjacent plant material. The dispensing tube extends from the needle member up the inner tubular support and thence laterally to a source F of pressurized chemical. A compression spring G urges the inner support upwardly with respect to the outer support.

By providing a compression spring G urging the exterior tubular guide member A downwardly over the needle a guard is provided therefor except when placed against the ground with a downward force exerted against the inner tubular support.

Figure 2:
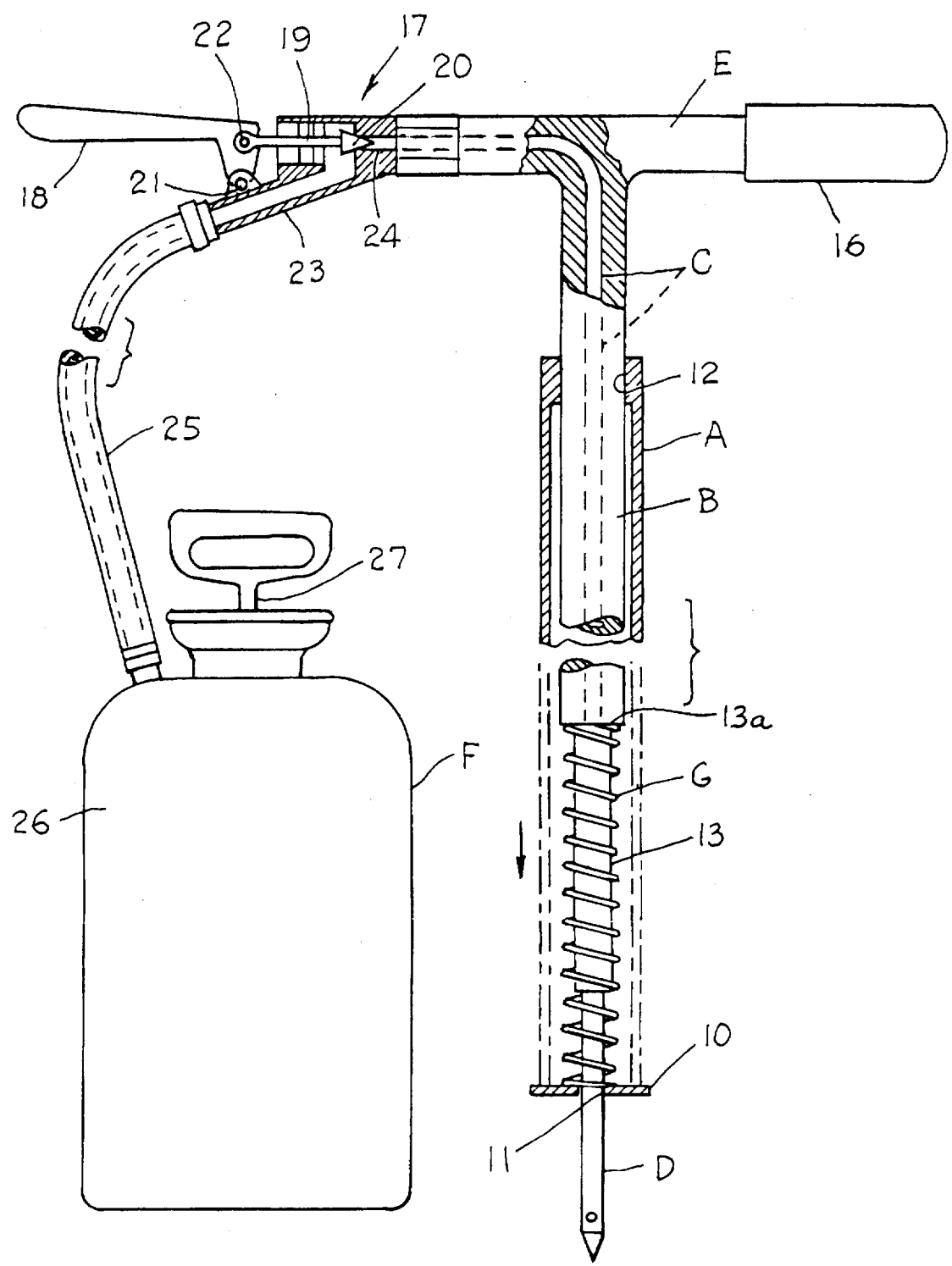
FIG. 2 is an enlarged front elevation with parts omitted further illustrating the apparatus of FIG. 1.

The elongated tubular guide A carries a disk-like member 10 on a lower end for engaging the soil preparatory to injecting the needle into the earth. The disk-like member 10 has an opening 11 therein (FIG. 2) for acting as a guide for the needle while the upper end has an internal collar 12 for slidably receiving the inner tubular support B for acting as a guide. The inner tubular support B has a reduced lower end as illustrated at 13 while a larger tubular section 14 extends upwardly through the collar 12. A lower end of the reduced section 13 has a coupling member 15 for securing a dispensing tube C at its lower end to the needle D. An upper end of the dispensing tube C passes through a hollow transverse handle E which is fixed to the upper end of the inner tubular support B.

The handle E is illustrated as having a handlebar 16 on one of its ends while the other end carries a valve broadly designated at 17. The valve 17 includes a pivotal handle 18 which carries a plunger 19 for moving a valve closure member 20 to open and closed position. The handle 18 is pivotally secured as at 21 to a fitting for connecting the valve to the source of pressurized chemical F. The plunger 19 is pivoted as at 22 for moving the valve member 20 to open and close a port 24 to supply liquid to the dispensing tube C. The coupling or fitting 23 is connected through a hose 25 to the source of pressurized chemical F. The source F includes a pressurized tank 26 having a pump internally of the tank and including a pump handle 27 for manually providing pressure in the tank.

A compression spring G is illustrated as secured in position about the inner tubular support B at its reduced lower end 13 between an abutment formed at a lower end by the disk 10 and by a shoulder 13a at an upper end.

Figure 3:
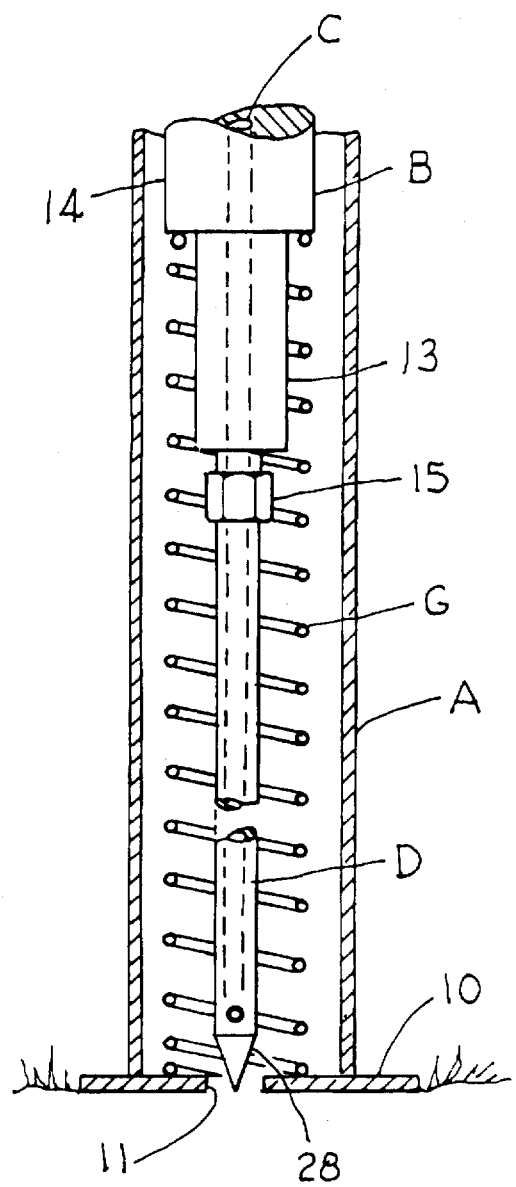
FIG. 3 is an enlarged sectional elevation similar to FIG. 2 illustrating a first step in the method of injecting the chemical into the earth which includes positioning a spring biased elongated guide onto the earth on one end preparatory to Exerting a downward force against the needle for lowering same adjacent the compression spring.
Figure 4:
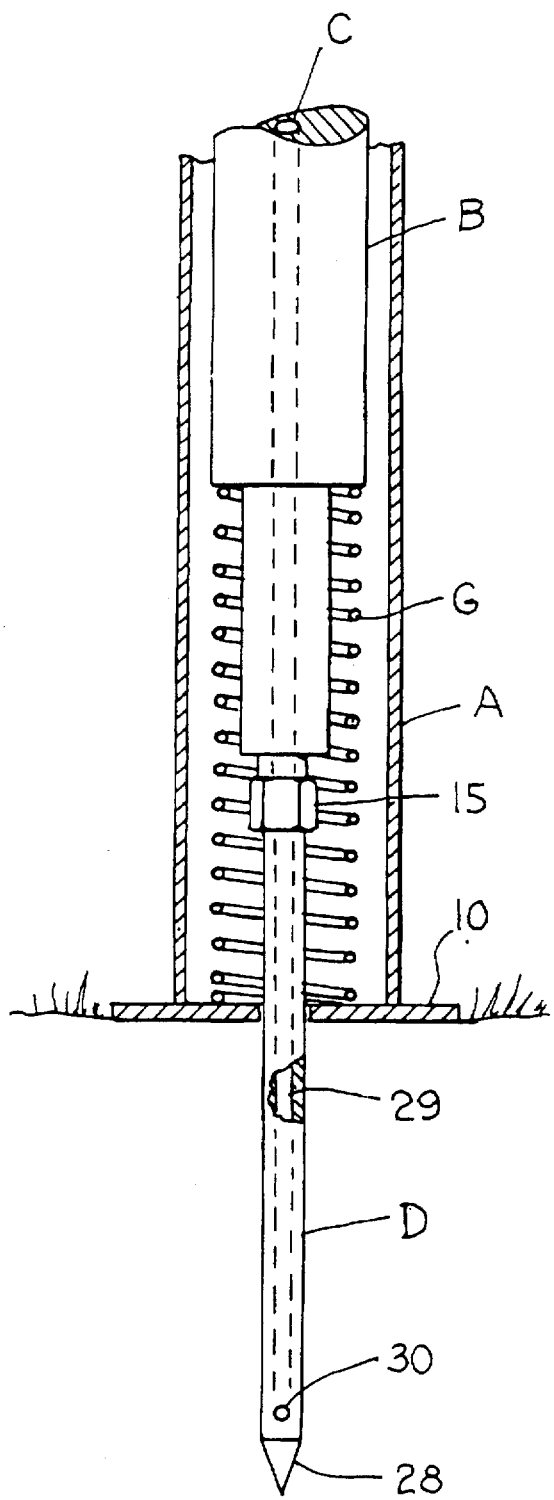
FIG. 4 is a sectional elevation similar to FIG. 3 illustrating the needle in lowered position in the earth against the force of the spring.

FIGS. 3 and 4 best illustrate the needle D which has a sharpened lower end illustrated at 28 together with an elongated internal opening 29. Suitable openings 30 are provided adjacent the point for permitting discharge of the liquid chemical through the end of the needle.

Figure 1:
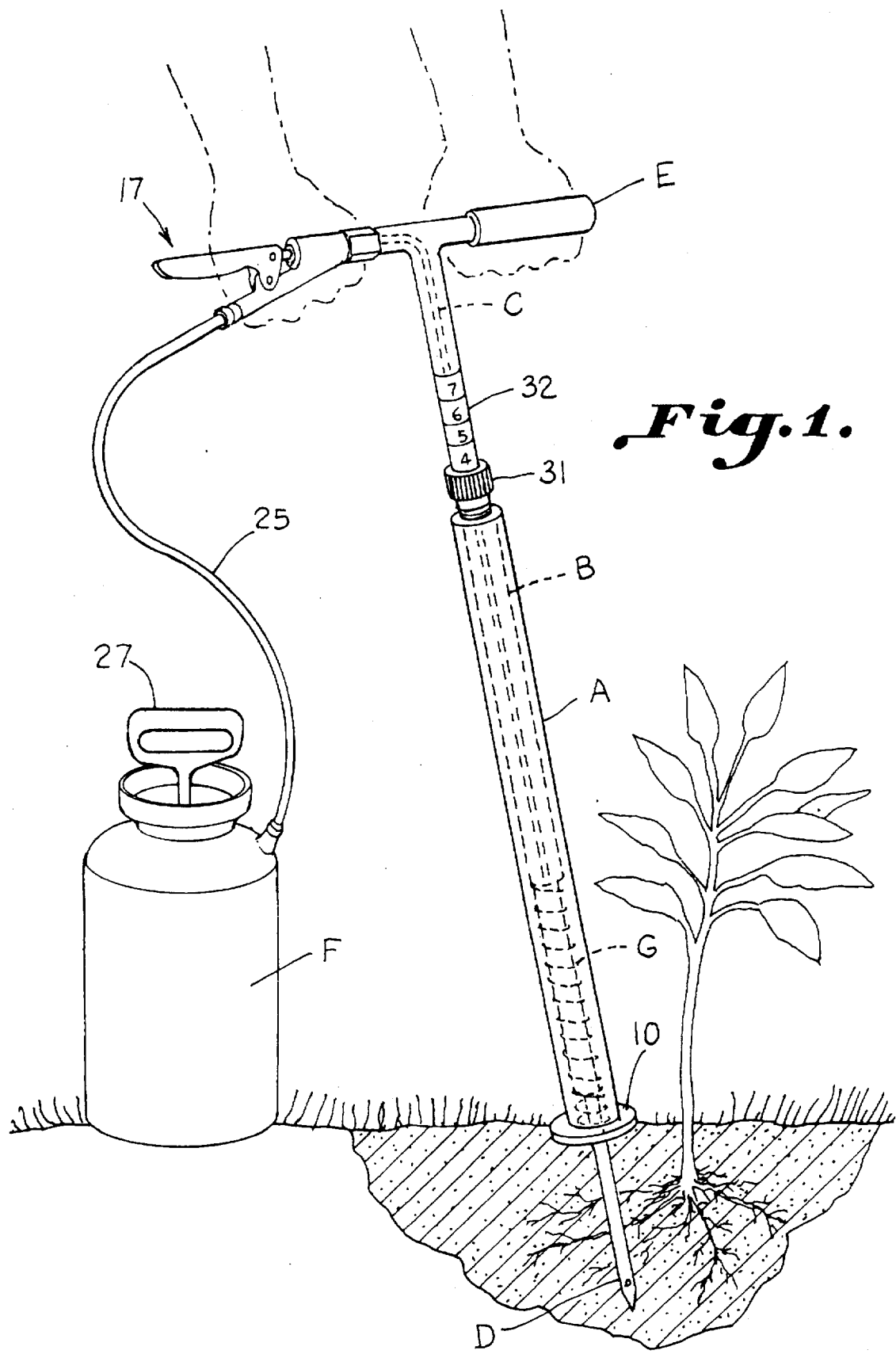
FIG. 1 is a perspective view illustrating apparatus constructed in accordance with the invention wherein an elongated needle is injected into soil adjacent the roots of a plant against the force of a compression spring tending to lower an elongated guide member which also serves as a guard for the needle, together with a handle for exerting downward pressure on the needle together with attachment to a source of liquid chemical under pressure.

In FIG. 3 the disk 10 has been placed against the earth preparatory to pushing downwardly on the needle E to cause the needle to push through the disk causing the needle to act like a guide at a lower end of a tubular guide member A. FIG. 4 illustrates the penetration of the soil or earth surrounding the roots of a plant so as to discharge chemical without injuring grass or shrubbery. A threadable stop 31 is provided on the inner tubular support for limiting movement between the inner tubular support and the exterior tubular guide thus governing the depth of penetration of the needle as indicated on the gage 32 as illustrated in FIG. 1. By removing the coupling member 15 the needle and tube may be removed and exchanged as when converting from dispensing a herbicide to dispensing fertilizer.

While a preferred embodiment of the invention has been described using specific terms, such description is for illustrative purposes only, and it is to be understood that changes and variations may be made without departing from the spirit or scope of the following claims.

What is claimed is:

1. An applicator for introducing a liquid chemical composition adjacent the roots of a plant comprising:

an elongated, exterior tubular guide;

a ground engaging member on a lower portion of the tubular guide;

an elongated, inner tubular support carried within and slidable with respect to said exterior guide;

a dispensing tube carried within said inner tubular support;

an elongated needle penetrating member carried by said inner tubular support communicating with said dispensing tube retractable within said exterior guide, and having an orifice therein to facilitate a flow of chemical;

a spring within said exterior tubular guide urging said inner support upwardly with respect to said exterior tubular guide;

a handle carried by a free upper end of said inner support; and said ground engaging member permitting the needle penetrating member to move downwardly with respect thereto into the ground when forced therein by pushing downwardly on the handle;

whereby application of said chemical may be limited to the root area of a plant to avoid application to other adjacent plant material.

2. The structure set forth in claim 1 wherein said dispensing tube extends from said needle penetrating member up the inner tubular support and thence to a source of pressurized liquid chemical composition.

3. The structure set forth in claim 2 wherein said source of pressurized liquid chemical composition is a tank having a hand-operated pump for developing pressure in said tank.

4. The structure set forth in claim 3 wherein said handle is transversely carried across said inner tubular support, and a valve and valve operator carried adjacent said handle for controlling flow of liquid to the needle penetrating member.

5. The structure set forth in claim 1 including a longitudinally adjustable stop for limiting movement between the inner tubular support and the exterior tubular guide thus governing the depth of penetration of the needle penetrating member.

6. An applicator for introducing a liquid chemical composition adjacent the roots of a plant comprising:

an elongated, tubular support for placement adjacent the ground on one end thereof;

a dispensing means carried within said support;

an elongated needle penetrating member carried on said dispensing means having an orifice therein to facilitate the flow of chemical;

a handle carried by a free end of said dispensing means;

a connecting member communicating with said dispensing means for receiving said liquid chemical composition from a pressurized container separate from said applicator;

a spring within said tubular support exerting a compressive force between said dispensing means and said support; and a longitudinally adjustable stop for limiting movement between the tubular support and the dispensing means thus governing the depth of penetration of the needle penetrating member;

whereby application of a chemical may be concentrated at the root area of a plant to avoid application to the other plant material.

7. The method of applying a liquid chemical composition adjacent the roots of a plant comprising the steps of:

providing an elongated tubular support carrying an aligned elongated hollow needle on one end, said needle having an opening adjacent a free end for discharging said liquid chemical composition;

connecting a pressurized tank containing said liquid chemical composition for supplying said composition to said needle;

exerting a downward force on said tubular support for inserting the needle into the soil;

providing a tubular guide member carrying said tubular support; and resiliently urging said tubular guide member over the needle acting as a guard therefor except when placed against the ground with a downward force exerted against the tubular support; and opening a valve causing said pressurized liquid chemical composition to flow through said needle;

whereby only the roots are treated avoiding contact of adjacent plants with the chemical composition.

8. The method set forth in claim 7 including the steps of providing a handle on an end of said tubular support opposite said needle; and positioning said valve adjacent said handle.

* * * * *